US011297283B2

(12) United States Patent
Tsubaki et al.

(10) Patent No.: US 11,297,283 B2
(45) Date of Patent: Apr. 5, 2022

(54) VIDEO MANAGEMENT APPARATUS, VIDEO MANAGEMENT METHOD AND PROGRAM

(71) Applicant: NIPPON TELEGRAPH AND TELEPHONE CORPORATION, Tokyo (JP)

(72) Inventors: Takuma Tsubaki, Musashino (JP); Naoki Higo, Musashino (JP); Kojun Koshiji, Musashino (JP); Toshimitsu Tsubaki, Musashino (JP); Takeshi Kuwahara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/288,025

(22) PCT Filed: Oct. 10, 2019

(86) PCT No.: PCT/JP2019/040067
§ 371 (c)(1),
(2) Date: Apr. 23, 2021

(87) PCT Pub. No.: WO2020/085107
PCT Pub. Date: Apr. 30, 2020

(65) Prior Publication Data
US 2021/0400239 A1 Dec. 23, 2021

(30) Foreign Application Priority Data
Oct. 23, 2018 (JP) .............................. JP2018-199359

(51) Int. Cl.
*H04N 7/18* (2006.01)
*H04N 5/765* (2006.01)
*G06F 3/06* (2006.01)

(52) U.S. Cl.
CPC ............. *H04N 7/181* (2013.01); *G06F 3/067* (2013.01); *G06F 3/0608* (2013.01);
(Continued)

(58) Field of Classification Search
CPC ........ H04N 7/181; H04N 5/765; H04N 7/188; G06F 3/0608; G06F 3/0652; G06F 3/067
See application file for complete search history.

(56) References Cited

U.S. PATENT DOCUMENTS

2015/0268866 A1* 9/2015 Nakagawa ............ G06F 3/0605
711/114
2018/0349265 A1* 12/2018 Kashimoto ......... G06F 12/0238
2019/0018595 A1* 1/2019 Gupta ..................... G06F 3/067

OTHER PUBLICATIONS

Kimming So and Rudolph N. Rechtschaffen, "Cache Operations by MRU Change", IEEE Transactions on Computers. vol. 31. No. 6, pp. 700-709, 1988.
(Continued)

*Primary Examiner* — Sunghyoun Park
(74) *Attorney, Agent, or Firm* — IPUSA, PLLC

(57) ABSTRACT

A video management apparatus includes a storage processing unit configured to store, in a storage unit, video data received through a network, a determination unit configured to determine whether or not video data groups stored in the storage unit are analyzed based on a first period of time indicating a period of time until a free capacity becomes insufficient in the storage unit and a second period of time indicating a maximum analysis time required for analysis of the video data groups, a first calculation unit configured to analyze the video data groups to calculate a predetermined statistic in a case where it is determined that the video data groups are analyzed, and a deletion unit configured to delete the analyzed video data groups.

7 Claims, 8 Drawing Sheets

(52) U.S. Cl.
CPC ............ *G06F 3/0652* (2013.01); *H04N 5/765* (2013.01); *H04N 7/188* (2013.01)

(56) References Cited

OTHER PUBLICATIONS

John T. Robinson Murthy V. Devarakonda, "Data Cache Management Using Frequency-Based Replacement", SIGMETRICS '90 Proceedings of the 1990 ACM SIGMETRICS conference on Measurement and modeling of computer systems, pp. 134-142, 1990.

\* cited by examiner

| CAMERA ID | VIDEO ID | DETECTION TIME | STORAGE STARTING TIME | STORAGE TERMINATION TIME | USE INFORMATION |
|---|---|---|---|---|---|
| CAMERA B | B1 | 20180721103011 | 20180721103007 | 20180721103015 | ANALYSIS |
| CAMERA A | A1 | 20180721103011 | 20180721103001 | 20180721103021 | VIEWING |
| CAMERA A | A2 | 20180721103014 | 20180721103010 | 20180721103018 | VIEWING |
| .. | .. | .. | .. | .. | .. |

Fig. 7

VIDEO MANAGEMENT APPARATUS, VIDEO MANAGEMENT METHOD AND PROGRAM

TECHNICAL FIELD

The present disclosure relates to a video management apparatus, a video management method, and a program.

BACKGROUND ART

As video Internet of Things (IoT) becomes widespread, monitoring cameras are being disposed for various purposes such as crime prevention in stores, ecological records of animals, and marketing, and video files generated by the monitoring cameras are stored in storages through a network for long periods of time, whereby it is possible to view and analyze the videos at remote locations.

When a video is recorded for 24 hours by a monitoring camera, the amount of data becomes enormous, and it is not possible to easily extract a necessary video. In response to this, a monitoring camera has already been manufactured that responds to only a moving object using a "moving body detection" function, acquires only necessary video data by performing imaging for a fixed period of time, thereby reducing the the amount of data.

Even when the amount of data is suppressed using the "moving body detection" function, a storage capacity is limited, and thus new video files may not be stored due to insufficient capacity as the operation thereof continues. For this reason, it is necessary to delete unnecessary video files in accordance with a trigger to secure a required storage capacity.

FIG. 1 is a diagram illustrating an example in which video files generated by monitoring cameras having a "moving body detection" function is stored in a storage through a network. In FIG. 1, when an individual monitoring camera detects an object, the monitoring camera takes video images of the object for a fixed period of time to generate a video file (S1). The monitoring cameras transmit the generated video files to the storage through a network (S2). As a result, the video files are stored in the storage (S3). Here, a storage capacity is limited, and thus it is necessary to delete unnecessary video files stored in the storage in accordance with a trigger (S4). Note that, although a plurality of files (video files) may be created from data (video data) generated by a monitoring camera taking video images for a fixed period of time, video files are also hereinafter referred to as video data below on the assumption that one video file is created from one piece of video data.

A technique for deleting video data on the basis of a priority according to a time and a frequency (hereinafter referred to as "the related art") has been proposed.

CITATION LIST

Non Patent Literature

Non Patent Literature 1: KIMMING SO AND RUDOLPH N. RECHTSCHAFFEN, "Cache Operations by MRU Change", IEEE TRANSACTIONS ON COMPUTERS. VOL. 31. NO. 6, pp. 700-709, 1988
Non Patent Literature 2: John T. Robinson Murthy V. Devarakonda, "Data Cache Management Using Frequency-Based Replacement", SIGMETRICS '90 Proceedings of the 1990 ACM SIGMETRICS conference on Measurement and modeling of computer systems, pp. 134-142, 1990

SUMMARY OF THE INVENTION

Technical Problem

Here, for the purpose of disposing monitoring cameras, a predetermined statistic (for example, the number of faces recorded in a video, or the like) can be acquired by performing video analysis of a certain number of video data groups. In such a case, these video data groups may be deleted. For example, for the purpose of marketing, a statistic of the number of people passing a location where a monitoring camera is disposed may be acquired by performing video analysis of a video data group.

However, in the related art, video data cannot be deleted in consideration of an acquisition state of a statistic.

The present disclosure is contrived in view of the above-described circumstances, and an object thereof is to delete a video in consideration of an acquisition state of a statistic.

Means for Solving the Problem

Consequently, in order to solve the above-described problem, a video management apparatus includes a storage processing unit configured to store, in a storage unit, video data received through a network, a determination unit configured to determine whether or not video data groups stored in the storage unit are analyzed based on a first period of time indicating a period of time until a free capacity becomes insufficient in the storage unit and a second period of time indicating a maximum analysis time required to analyze the video data groups, a first calculation unit configured to analyze the video data groups and calculate a predetermined statistic in a case where it is determined that the video data groups are analyzed, and a deletion unit configured to delete the analyzed video data groups.

Effects of the Invention

It is possible to delete a video in consideration of an acquisition state of a statistic.

BRIEF DESCRIPTION OF DRAWINGS

FIG. 7 is a diagram illustrating an example of a configuration of an assigned information storage unit 121 according to the embodiment of the present disclosure.

DESCRIPTION OF EMBODIMENT

Figure 1:
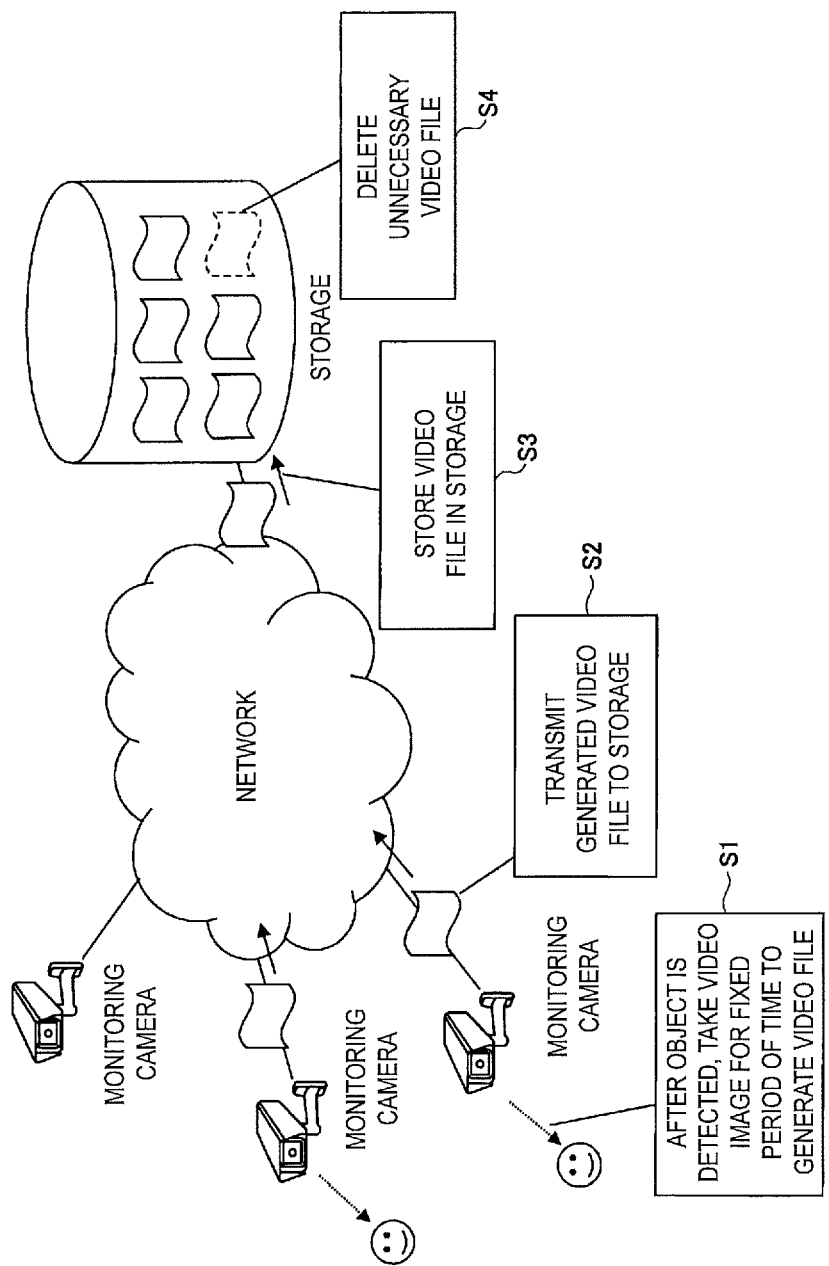
FIG. 1 is a diagram illustrating an example in which a video file generated by monitoring cameras having a "moving body detection" function is stored in a storage through a network.
Figure 2:
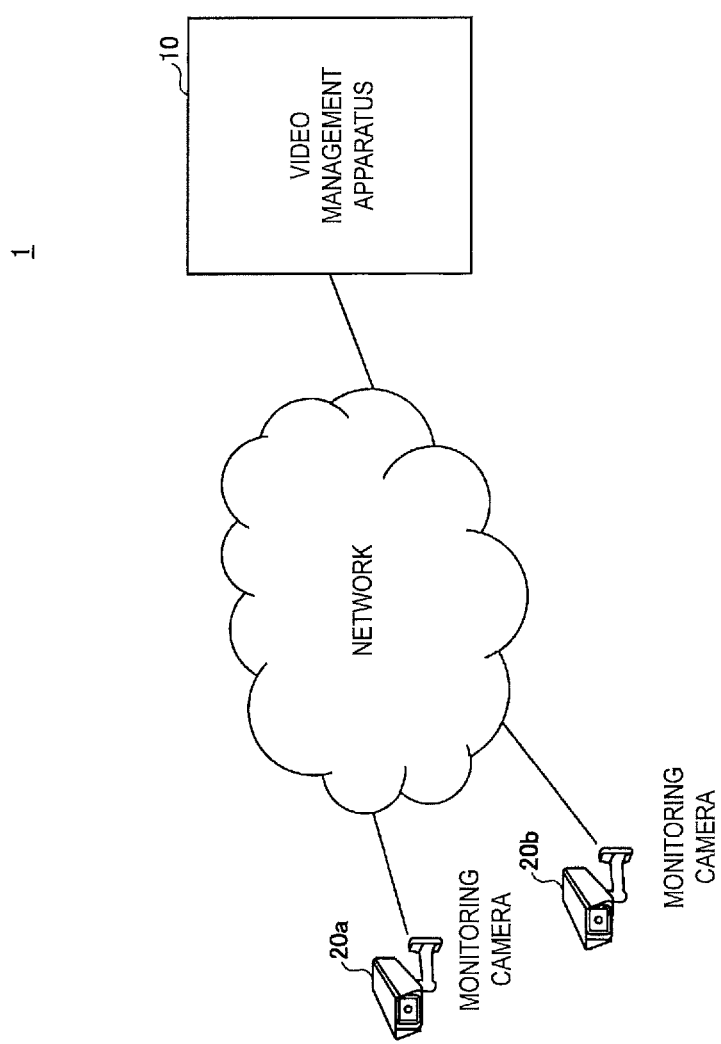
FIG. 2 is a diagram illustrating an example of a configuration of a video management system 1 according to an embodiment of the present disclosure.

Hereinafter, an embodiment of the present disclosure will be described with reference to the drawings. FIG. 2 is a diagram illustrating an example of a configuration of a video management system 1 according to an embodiment of the present disclosure. The video management system 1 illustrated in FIG. 2 includes one or more monitoring cameras 20 such as a monitoring camera 20a and a monitoring camera 20b (hereinafter referred to simply as a "monitoring camera 20" in a case where the monitoring cameras are not distinguished from each other) and a video management apparatus 10. The monitoring cameras 20 are connected to the video management apparatus 10 through a network such as the Internet.

For various purposes such as crime prevention in stores, ecological records of animals, and marketing, the monitoring cameras 20 are installed (fixed) at imaging locations corresponding to respective purposes. The monitoring cameras 20 transmit data in which video images taken at the respective installation locations (imaging locations) are recorded (that is, video data) to the video management apparatus 10.

The video management apparatus 10 stores the video data transmitted from the monitoring cameras 20. The stored video data is used for viewing, analysis, and the like.

Here, the video management apparatus 10 analyzes the stored video data group to calculate (acquire) a statistic and delete the video data. In this case, it is preferable to calculate the statistic using as many pieces of video data as possible, but a longer period of time is required as the number of pieces of video data increases. For this reason, a remaining storage capacity (free capacity) of a storage (storage unit) is eliminated (consumed) before video data is deleted depending on a free capacity of the storage in which the video data is stored, and thus new video data may not be stored. Consequently, in the present embodiment, a statistic is calculated by performing video analysis with an appropriate number of pieces of video data (that is, with as many pieces of video data as possible by video analysis completed before a free capacity is exhausted), on the basis of the remaining storage capacity of the storage (storage unit) in which video data is stored.

Figure 3:
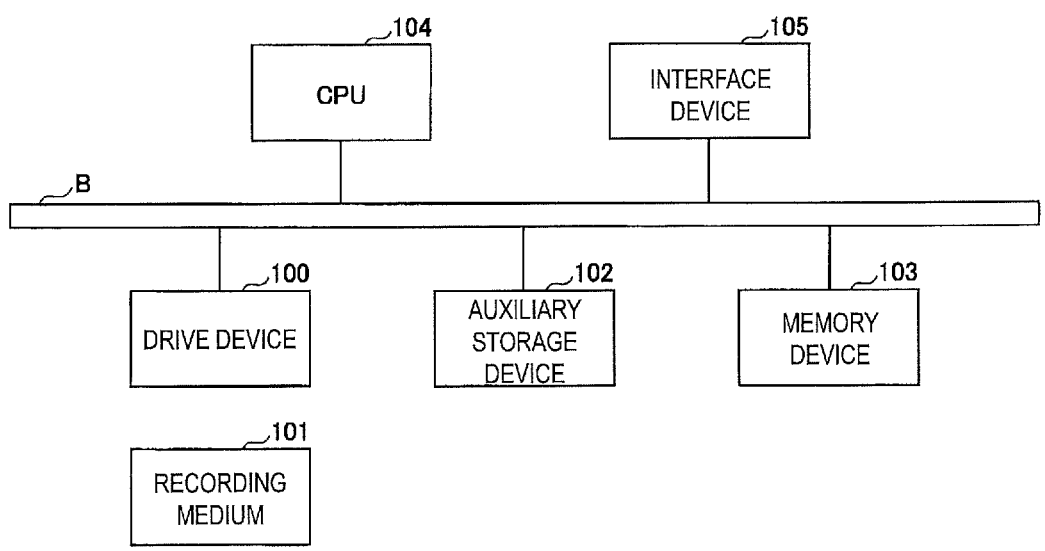
FIG. 3 is a diagram illustrating an example of a hardware configuration of a video management apparatus 10 according to the embodiment of the present disclosure.

FIG. 3 is a diagram illustrating an example of a hardware configuration of the video management apparatus 10 according to the embodiment of the present disclosure. As illustrated in FIG. 3, the video management apparatus 10 includes a drive device 100, an auxiliary storage device 102, a memory device 103, a central processing unit (CPU) 104, an interface device 105, and the like which are connected to each other by a bus B.

A program that realizes processing in the video management apparatus 10 is provided on a recording medium 101 such as a CD-ROM. When the recording medium 101 storing the program is set in the drive device 100, the program is installed on the auxiliary storage device 102 from the recording medium 101 through the drive device 100. However, the installation of the program does not necessarily need to be performed from the recording medium 101, and the program may be downloaded from another computer through a network. The auxiliary storage device 102 stores the installed program and also stores necessary files, data, and the like.

The memory device 103 reads the program from the auxiliary storage device 102 and stores the program in a case where an instruction for starting the program is given. The CPU 104 executes a function related to the video management apparatus 10 in accordance with the program stored in the memory device 103. The interface device 105 is used as an interface for connecting to a network.

Figure 4:
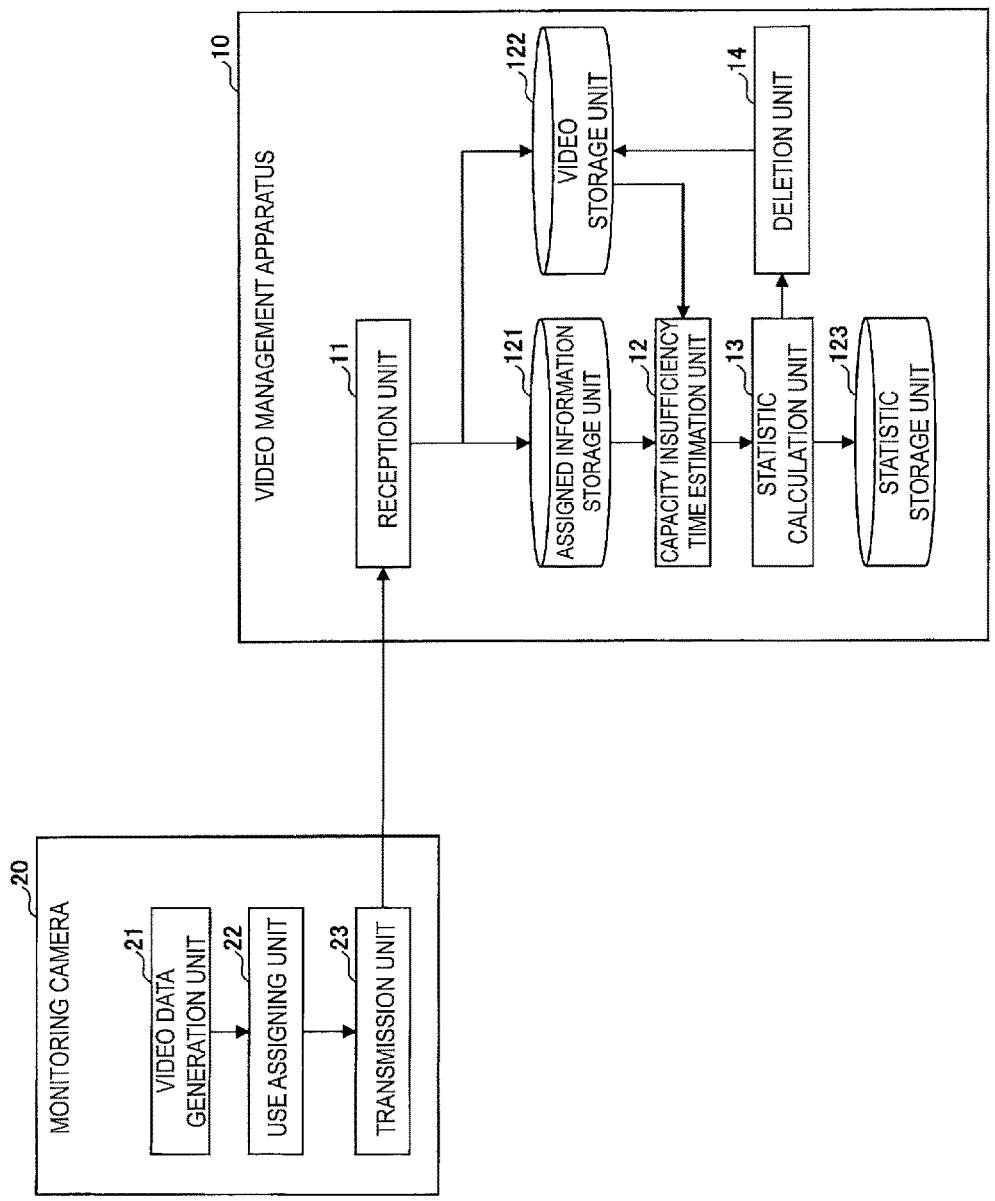
FIG. 4 is a diagram illustrating an example of a functional configuration of the video management system 1 according to the embodiment of the present disclosure.

FIG. 4 is a diagram illustrating an example of a functional configuration of the video management system 1 according to the embodiment of the present disclosure. In FIG. 4, the monitoring camera 20 includes a video data generation unit 21, a use assigning unit 22, a transmission unit 23, and the like. These units are realized by a processing that one or more programs installed in the monitoring camera 20 cause the CPU of the monitoring camera 20 to execute.

The video data generation unit 21 generates video data in which video images taken by the monitoring cameras 20 for a predetermined period of time are recorded. For example, the monitoring camera 20 may start taking video images upon detecting a moving body or the like as a trigger. In this case, a period of taking video images required for one piece of video data depends on the implementation of a moving body detection function. The video data generation unit 21 assigns, to the generated video data, video data identification information of generated video data (hereinafter referred to as a "video ID") and information regarding the imaging of the video data such as a timing of moving body detection. Note that, as described above, both one piece of video data and one video file are referred to as "video data" without distinction on the assumption that one video file is created from one piece of video data, but the present disclosure is not limited thereto. For example, in a case where an imaging time for one piece of video data is long, or the like, a plurality of video files may be created from one piece of video data.

The use assigning unit 22 assigns information indicating the use (the purpose of use) of video data (hereinafter referred to as "use information") which is determined in advance for each monitoring camera 20 and for each piece of video data. Examples of the use of video data include "viewing", "analysis" and the like. "Viewing" indicates that the use of video data is viewing (the video data is used for viewing), and the use information "viewing" is assigned, for example, in a case where video data is used for crime prevention, or the like. On the other hand, "analysis" indicates that the use of video data is for video analysis (the video data is used for video analysis), and the use information "analysis" is assigned, for example, in a case where video data is used for marketing, or the like. Note that video data having use information of "analysis" is subjected to video analysis.

In the present embodiment, as an example, video data generated by the monitoring camera 20a is used for the purpose of crime prevention, and it is assumed that use information "viewing" is assigned thereto. In addition, video data generated by the monitoring camera 20b is used for the purpose of marketing, and it is assumed that use information "analysis" is assigned thereto.

Note that information including use information and information assigned to video data by the video data generation unit 21 will be referred to as "assigned information" below.

The transmission unit 23 transmits video data with assigned information to the video management apparatus 10.

On the other hand, the video management apparatus 10 includes a reception unit 11, a capacity insufficiency time estimation unit 12, a statistic calculation unit 13, a deletion unit 14, and the like. These units are realized by a processing that one or more programs installed in the video management apparatus 10 cause the CPU 104 to execute. The video management apparatus 10 also uses an assigned information storage unit 121, a video storage unit 122, a statistic storage unit 123, and the like. These storage units can be realized using, for example, the auxiliary storage device 102, or a storage device capable of being connected to the video management apparatus 10 through a network.

The reception unit 11 receives video data to which assigned information has been assigned and which has been transmitted by the transmission unit 23. The reception unit 11 stores the assigned information in the assigned information storage unit 121 and stores the video data in the video storage unit 122. The assigned information and the video data are associated with each other on the basis of a video ID of the video data.

The capacity insufficiency time estimation unit 12 calculates a period of time until a free capacity becomes insufficient at the time of storing new video data in the video storage unit 122 (hereinafter referred to as a "capacity insufficiency time") based on the available free capacity of the video storage unit 122 and the data amount of individual video data estimated to be stored in the video storage unit 122 per unit time.

The statistic calculation unit 13 compares the maximum time required for statistical analysis of a video data group (hereinafter referred to as a "maximum video analysis time") and the capacity insufficiency time with each other and performs video analysis at a point in time when the maximum video analysis time becomes equal to or greater than the capacity insufficiency time to calculate a statistic of a video data group to be subjected to video analysis. The statistic calculation unit 13 stores the calculated statistic in the statistic storage unit 123.

The deletion unit 14 deletes the video data group having been subjected to video analysis (that is, a video data group for which a statistic has been calculated) from the video storage unit 122.

Figure 5:
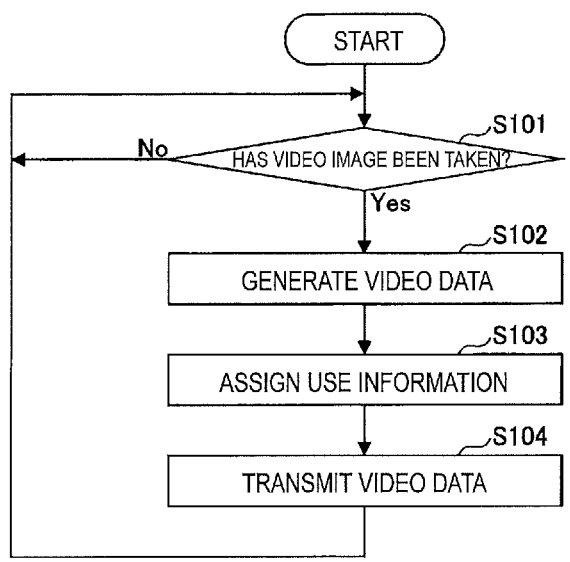
FIG. 5 is a flowchart illustrating an example of a processing procedure executed by a monitoring camera 20 according to the embodiment of the present disclosure.

Hereinafter, a processing procedure which is executed in the video management system 1 will be described. FIG. 5 is a flowchart illustrating an example of a processing procedure which is executed by the monitoring camera 20 according to the embodiment of the present disclosure.

When video images are taken for a predetermined period of time with the detection of a moving body or the like as a trigger (Yes in S101), the video data generation unit 21 generates video data in which video images taken for the predetermined period of time is recorded (S102). In this case, the video data generation unit 21 assigns, to the video data, information regarding the imaging of video data such as a video ID, a detection time, a storage starting time, and a storage termination time. The detection time is the time at which a moving body is detected. The storage starting time is the time at which the storage (recording) of video data is started. The storage termination time is the time at which the storage (recording) of video data is terminated. The information (the video ID, the detection time, the storage starting time, the storage termination time, and the like) constitutes assigned information along with use information.

Subsequently, the use assigning unit 22 assigns the use information determined in advance for each monitoring camera 20 to the video data (S103). For example, in the present embodiment, when video data is taken by the monitoring camera 20a, the use assigning unit 22 of the monitoring camera 20a assigns use information "viewing" to the video data. On the other hand, for example, when video data is taken by the monitoring camera 20b, the use assigning unit 22 of the monitoring camera 20b assigns use information "analysis" to the video data.

Subsequently, the transmission unit 23 transmits the video data with assigned information to the video management apparatus 10 (S104).

Figure 6:
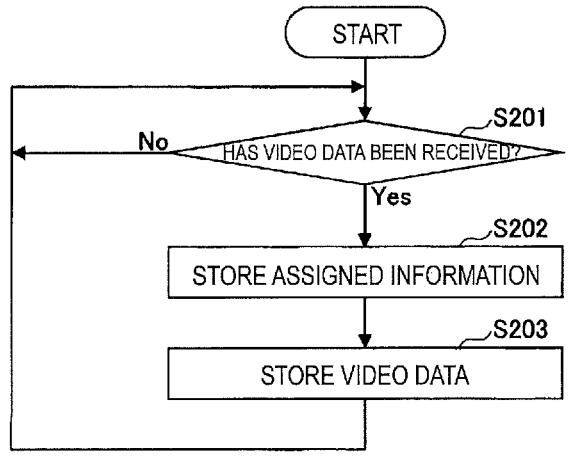
FIG. 6 is a flowchart illustrating an example of a processing procedure executed by the video management apparatus 10 in response to the reception of video data.

FIG. 6 is a flowchart illustrating an example of a processing procedure executed by the video management apparatus 10 in response to the reception of video data.

When the reception unit 11 receives video data transmitted in a state where assigned information is assigned to the video data in any one monitoring camera 20 (Yes in S201), the reception unit 11 stores the assigned information assigned to the video data in the assigned information storage unit 121 (S202).

FIG. 7 is a diagram illustrating an example of a configuration of the assigned information storage unit 121 according to the embodiment of the present disclosure. As illustrated in FIG. 7, the assigned information storage unit 121 stores assigned information assigned for each piece of video data received in the past. Note that the camera ID in FIG. 7 is identification information of the monitoring camera 20.

Subsequently, the reception unit 11 stores video data in the video storage unit 122 in association with the video ID of the video data (S203). For example, in a case where video data is stored in a file system as a file, a video ID may be included in a file name of the file, so that association between the video data and the video ID may be achieved.

Figure 8:
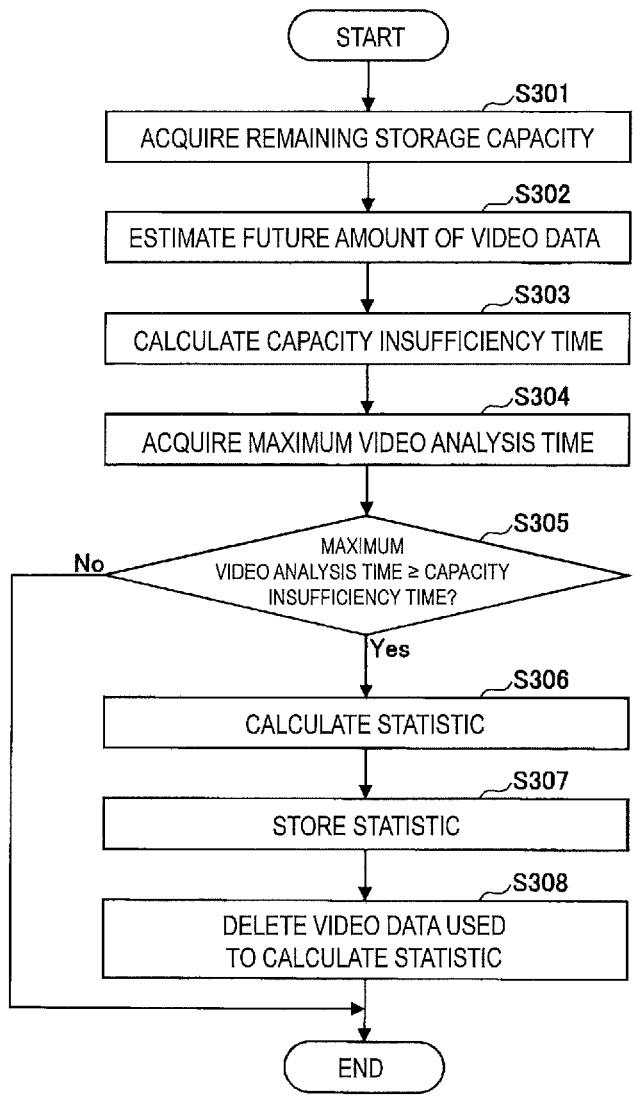
FIG. 8 is a flowchart illustrating an example of a processing procedure of statistic calculation and video data deletion processing.

FIG. 8 is a flowchart illustrating an example of a processing procedure of statistic calculation and video data deletion processing. Note that the processing procedure may be executed, for example, after the video data is stored in the video storage unit 122 in S203 described above or may be executed in a case where the free capacity after the video data is stored in the video storage unit 122 in S203 described above becomes equal to or less than a predetermined threshold value.

The capacity insufficiency time estimation unit 12 acquires information indicating the free capacity of the video storage unit 122 (S301). Hereinafter, the free capacity of the video storage unit 122 will be referred to as s.

Subsequently, the capacity insufficiency time estimation unit 12 estimates the data amount of individual video data estimated to be stored in the video storage unit 122 per unit time (hereinafter referred to as a "future amount of video data") (S302). The future amount of video data is estimated by an estimation method such as linear approximation, using video data of the monitoring camera 20 that is already been stored in the video storage unit 122 for each monitoring camera 20.

For example, if the future amount of video data (Mbit/s) of the monitoring camera 20a is set to be $w_1$, $w_1$ is estimated by an estimation method such as linear approximation, using video data of the monitoring camera 20a that is stored in the video storage unit 122. Similarly, for example, if the future amount of video data (Mbit/s) of the monitoring camera 20b is set to be $w_2$, $w_2$ is estimated by an estimation method such as linear approximation using video data of the monitoring camera 20b that is stored in the video storage unit 122. Hereinafter, future amounts of video data of the respective monitoring cameras 20 are set to be $w_1, \ldots, w_N$ on the assumption that a total number of monitoring cameras 20 is N.

Subsequently, the capacity insufficiency time estimation unit 12 calculates a capacity insufficiency time $t_c$ according to Equation (1) below (S303).

[Math. 1]

$$t_c = \frac{S}{\sum_{i=1}^{N} w_i} \quad (1)$$

According to Equation (1) described above, the capacity insufficiency time $t_c$ is a period of time until a free capacity becomes insufficient at the time of storing new video data in the video storage unit 122 (in other words, a period of time until a storage capacity of the video storage unit 122 becomes full).

Subsequently, the statistic calculation unit 13 acquires a maximum video analysis time $t_a$ (S304). The maximum video analysis time $t_a$ is a maximum time required for statistical analysis of a video data group. The maximum video analysis time $t_a$ is set in advance by a user, for example, in a configuration file or the like. However, the present disclosure is not limited thereto, and for example, a maximum period of time, among the past times required for video analysis performed by the statistic calculation unit 13, may be a maximum video analysis time $t_a$.

In a case where the maximum video analysis time $t_a$ is equal to or greater than the capacity insufficiency time $t_c$ when comparing the maximum video analysis time $t_a$ and the capacity insufficiency time $t_c$ with each other (Yes in S305), the statistic calculation unit 13 performs video analysis on video data having use information "analysis" assigned thereto among video data stored in the video storage unit 122 to calculate a statistic of the video data (S306).

Figure 9:
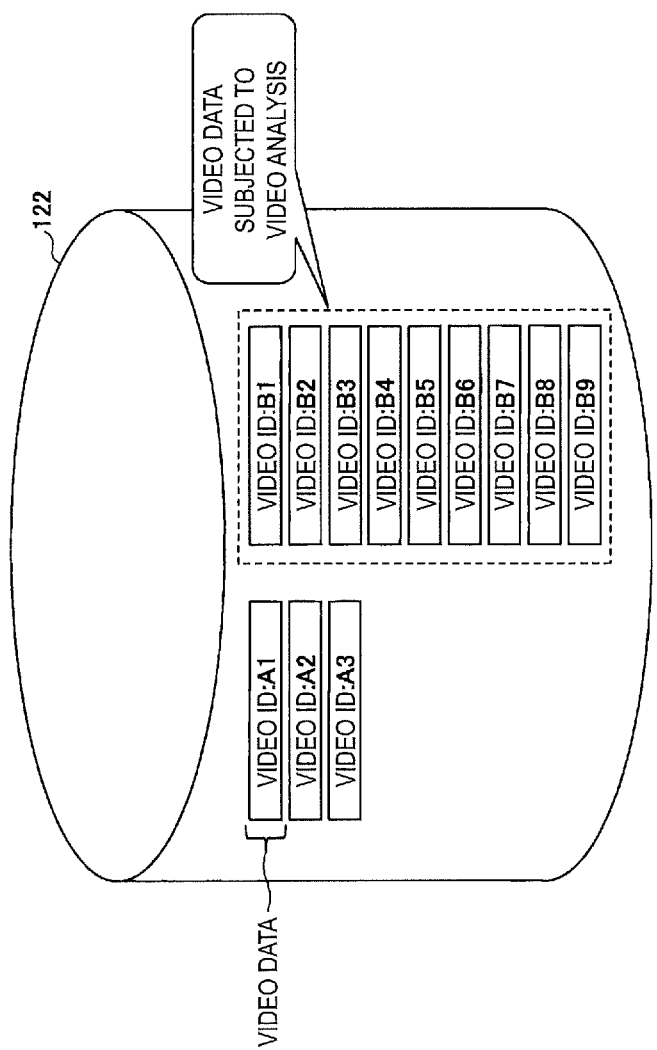
FIG. 9 is a diagram illustrating an example of video data to be subjected to video analysis.

For example, as illustrated in FIG. 9, it is assumed that video data (video IDs "A1", "A2" and "A3") taken by the monitoring camera 20a and video data (video IDs "B1", . . . , "B9") taken by the monitoring camera 20b are stored in the video storage unit 122. In this case, the statistic calculation unit 13 identifies use information assigned to each of the pieces of video data having the video IDs "A1", "A2" and "A3" and video data having the video IDs "B1", . . . , "B9" with reference to assigned information stored in the assigned information storage unit 121. In this case, assigned information of the video data having the video IDs "A1", "A2" and "A3" is identified as "viewing", and assigned information of the video data having the video IDs "B1", . . . , and "B9" is defined as "analysis". Thus, the video data having the video IDs "B1", . . . , and "B9" is subjected to video analysis, and the statistic calculation unit 13 performs video analysis on the video data having the video IDs "B1", . . . , and "B9" to calculate a predetermined statistic.

Note that the statistic to be calculated depends on the purpose of use of video data, and the like. For example, in a case where the purpose of use of the video data having the video IDs "B1", . . . , and "B9" is marketing and it is desired to acquire the number of people passing a location where the monitoring camera 20b is installed as a statistic, faces of the people may be recognized from a video to calculate a total number of faces as a statistic.

Subsequently, the statistic calculation unit 13 stores the statistic calculated in S306 described above in the statistic storage unit 123 (S307). In this case, the statistic calculation unit 13 stores the statistic in the statistic storage unit 123 in association with various information such as the date and time when video analysis is performed and a date and time of video data subjected to video analysis.

Subsequently, the deletion unit 14 deletes the video data subjected to video analysis in S306 described above from the video storage unit 122 (S308). For example, in the case of the example illustrated in FIG. 9, the video data having the video IDs "B1", . . . , and "B9" is deleted. Thereby, a video data group for which a statistic has been calculated (acquired) is deleted from the video storage unit 122.

As described above, according to the present embodiment, video data used for the calculation (acquisition) of a statistic can be deleted in consideration of the acquisition state of the statistic. Thereby, for example, as compared to a case where video data is simply deleted in order from the oldest time of video data, it is possible to efficiently acquire a statistic and delete video data, and it is possible to leave video data which is unnecessary for the acquisition of a statistic (that is, video data in which use information is "viewing"). For example, in FIG. 9, it is assumed that times (storage starting times) of video data in order from the oldest time are "A1", "A2", "B1", . . . , "B7", "A3", "B8" and "B9". In this case, when nine pieces of video data are deleted in order from the oldest time (storage starting times), "A1", "A2", "B1", . . . , and "B7" are deleted. Thus, in this case, video data which is unnecessary for the acquisition of a statistic (video data having the video IDs "A1" and "A2") is deleted, and the video data having the video IDs "B8" and "B9" is not deleted even when a statistic has been acquired using the video data having the video IDs "B8" and "B9".

Note that, in the present embodiment, it is assumed that use information is assigned to video data by the monitoring cameras 20, but the present disclosure is not limited thereto. For example, when the video management apparatus 10 receives video data, use information may be identified from a video ID which is assigned to the video data. Further, in this case, the video management apparatus 10 may identify the use information from the video ID with reference to a table in which video IDs and use information are associated with each other, or the like.

Note that, in the present embodiment, the video storage unit 122 is an example of a storage unit. The reception unit 11 is an example of a storage processing unit. The statistic calculation unit 13 is an example of a determination unit and a first calculation unit. The deletion unit 14 is an example of a deletion unit. The capacity insufficiency time estimation unit 12 is an example of a second calculation unit.

Although an embodiment of the present disclosure has been described above in detail, the present disclosure is not limited to such a specific embodiment, and various modifications or changes can be made within the scope of the present disclosure described in the claims.

REFERENCE SIGNS LIST

1 Video management system
10 Video management apparatus
11 Reception unit
12 Capacity insufficiency time estimation unit
13 Statistic calculation unit
14 Deletion unit
20 Monitoring camera
21 Video data generation unit
22 Use assigning unit
23 Transmission unit
100 Drive device
101 Recording medium
102 Auxiliary storage device 103 Memory device
104 CPU
105 Interface device
121 Assigned information storage unit
122 Video storage unit
123 Statistic storage unit
B Bus

The invention claimed is:

1. A video management apparatus comprising:
a processor configured to
to store, in a memory, video data received through a network;
determine whether or not video data groups stored in the memory are analyzed based on a first period of time indicating a period of time until a free capacity becomes insufficient in the memory and a second period of time indicating a maximum analysis time required for analysis of the video data groups;
analyze the video data groups to calculate a predetermined statistic in a case where it is determined that the video data groups are analyzed; and
delete the analyzed video data groups.

2. The video management apparatus according to claim 1, wherein the processor analyzes a video data group used for a predetermined use, among the video data groups, to calculate the predetermined statistic.

3. The video management apparatus according to claim 1, wherein the processor is configured to calculate the first period of time based on the free capacity of the memory and the video data groups stored in the memory.

4. A video management method comprising:
storing, in a memory, video data received through a network;
determining whether or not video data groups stored in the memory are analyzed based on a first period of time indicating a period of time until a free capacity becomes insufficient in the memory and a second period of time indicating a maximum analysis time required for analysis of the video data groups;
analyzing the video data groups to calculate a predetermined statistic in a case where it is determined that the video data groups are analyzed; and
deleting the analyzed video data groups,
wherein the storing, the determining, the analyzing, and the deleting are executed by a computer.

5. The video management method according to claim 4, wherein the analyzing includes analyzing a video data group used for a predetermined use, among the video data groups, to calculate the predetermined statistic.

6. The video management method according to claim 4, further comprising calculating the first period of time based on the free capacity of the memory and the video data groups stored in the memory.

7. A non-transitory computer-readable recording medium having stored therein a program causing a computer to execute the video management method according to claim 4.

* * * * *